(12) United States Patent
Romoscanu et al.

(10) Patent No.: US 8,668,946 B2
(45) Date of Patent: *Mar. 11, 2014

(54) SOLID PRODUCT COMPRISING OIL-DROPLETS

(75) Inventors: Alexandre Ioan Romoscanu, Geneva (CH); Raffaele Mezzenga, Preverenges (CH)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,114

(22) Filed: Mar. 30, 2012

(65) Prior Publication Data

US 2012/0189849 A1 Jul. 26, 2012

Related U.S. Application Data

(63) Continuation of application No. 12/293,444, filed as application No. PCT/EP2007/052404 on Mar. 14, 2007, now Pat. No. 8,147,896.

(30) Foreign Application Priority Data

Mar. 22, 2006 (EP) .................................... 06111524

(51) Int. Cl.
*A23P 1/04* (2006.01)

(52) U.S. Cl.
USPC ............................................ 426/98; 426/613

(58) Field of Classification Search
USPC .................................................... 426/98, 613
See application file for complete search history.

(56) References Cited

U.S. PATENT DOCUMENTS

| 2,800,457 | A | * | 7/1957 | Green et al. ............... 428/402.2 |
| 5,248,509 | A | | 9/1993 | Bruin |
| 5,620,734 | A | | 4/1997 | Wesdorp et al. |
| 6,039,901 | A | * | 3/2000 | Soper et al. .................... 264/4.3 |
| 6,325,951 | B1 | * | 12/2001 | Soper et al. .................... 264/4.3 |
| 8,147,896 | B2 | * | 4/2012 | Romoscanu et al. ......... 426/602 |

FOREIGN PATENT DOCUMENTS

WO   WO 2005110370   11/2005

OTHER PUBLICATIONS

Anon. 1982. The American Heritage Dictionary, 2nd edition. College Edition. Houghton Mifflin Co., p. 1082.*
Search Report for International Application No. PCT/EP2007/052404 mailed May 31, 2007.
Written Opinion for International Application No. PCT/EP2007/052404 mailed May 31, 2007.

* cited by examiner

*Primary Examiner* — Carolyn Paden
(74) *Attorney, Agent, or Firm* — K&L Gates LLP

(57) ABSTRACT

The present invention concerns a solid product comprising oil-droplets having a diameter in the range of 0.1 to 100 microns, cross-linked proteins at the interface of said droplets and any polar, low molecular compound in between the cross-linked protein interfaces.

1 Claim, 1 Drawing Sheet

SOLID PRODUCT COMPRISING OIL-DROPLETS

PRIORITY CLAIM

This application is a continuation of U.S. patent application Ser. No. 12/293,444, filed on Sep. 18, 2008, which is the U.S. national stage designation of International Application No. PCT/EP07/052404 filed Mar. 14, 2007, which claims priority to EP06111524.2 filed Mar. 22, 2006, the entire disclosures of which are incorporated by reference.

BACKGROUND

The present invention concerns a solid product comprising oil-droplets, as well as the process for producing this solid product and the use of such product.

Oil-based solid products are already known on the market. This is the case for example for margarine. The drawback of the margarine is that the oil which is used for the preparation of said product is hydrogenated, which leads to the saturation of the double carbon bondings. Today it is known in the nutritional area, that it is better to avoid this hydrogenation and to keep the insaturation of the double bondings. Keeping the insaturation in the oil has positive benefits for the health of the consumer.

SUMMARY

The objective of the present invention is to produce a solid oil product without hydrogenating the oil used.

The present invention concerns a solid product comprising oil-droplets having a diameter in the range of 0.1 to 100 microns, cross-linked proteins at the interface of said droplets and any polar, low molecular compound in between the cross-linked protein interfaces.

In the present specification, the expression "oil-droplets" means substantially spherical particles, like polyhedral particles.

The droplet size distribution is measured by light scattering using a Malvern MasterSizer.

The oil used according to the invention is taken from the group consisting of triglycerides and hydrocarbon oils.

More preferably, the oil used is taken in the group consisting of Medium Chain Triglycerides (MCT), olive oil, sunflower oil, paraffin oil and mineral oil.

The protein used in the product of the invention is taken in the group consisting of milk proteins and soy proteins. More preferably β-casein and β-lactoglobulin are used for the product of the invention. Sodium-caseinate can be used too.

The low molecular interstitial compound is taken from the group consisting of glycerol and saccharose.

It is also possible, that the solid product of the invention contains glutaraldehyde or transglutaminase. This is not the preferred embodiment of the invention.

The amount of oil is comprised between 90 and 100%. In the specification, all the % are given in weight. The amount of protein is between 0.1 and 5%. The amount of low molecular interstitial compound is up to 2%.

The present invention concerns further a process for the preparation of the solid oil product here above described, wherein an oil is dispersed in a protein solution to yield an emulsion, the emulsion is homogenised and washed with water, glutaraldehyde or transglutaminase is added or the concentrated emulsion is heated and a polar, low molecular interstitial compound is added.

According to the preferred embodiment of the invention, the emulsion is heated at around 80° C. for about between 10 to 60 minutes, without the presence of enzymatic or chemical crosslinking agents.

According to a second embodiment, the emulsion is poured in the same volume of 1% weight glutaraldehyde aqueous solution, left a certain time and washed to separate non-reacted glutaraldehyde.

According to a third embodiment, the emulsion is poured in the same volume of 1 unit/g transglutaminase.

The present invention concerns further the use of the solid oil product as described above, wherein said solid oil is used as inclusion or matrix in food products to include non-hydrogenated solidified oil. The amount of the solid oil product added in the food product can vary very broadly. For example, the amount can be comprised between 0.1 and 99%. There is no criticality in the type of food product, wherein the solid product can be added. For example, it can be added in culinary products of any type.

According to another feature of the invention, the product of the invention is used in cosmetic products as a solid encapsulation matrix for lipophilic compounds. In this case, the amount of product used can also vary broadly. This amount can vary between 0.1 and 99%.

According to a further feature of the invention the use of the solid oil product may be exploited for its low viscous lubrication properties.

The product of the invention can be either able to be reemulsified (this is a good way for the use in the culinary area) or not able to be reemulsified (this is a good way of use for the cosmetic and lubricating area).

Finally, the present invention concerns also a method of obtaining a solid oil with inhomogeneous cell composition, wherein said solid oil is prepared according to the process as above described, by mixing two different oil emulsions cross-linked as described above, and exposing the mixture of emulsions to water evaporation in order to produce a gel whose cells are made on multiple oil phases.

Additional features and advantages are described herein, and will be apparent from the following Detailed Description and the figures.

BRIEF DESCRIPTION OF THE FIGURES

The description is now made in relation to the figures.

DETAILED DESCRIPTION

Figure 1:
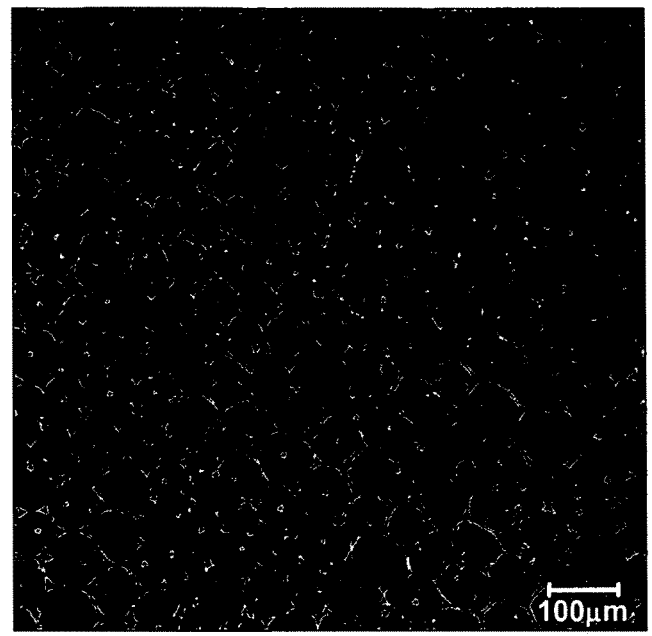
FIG. 1 shows the internal structure of a gel resulting from a monodispersed emulsion created with droplet diameter of 80 μm, as revealed by confocal microscopy. In order to image the protein phase, rhodamine, in a concentration of $10^{-10}$ is added to the pH=7.0 buffered water phase used in the final washing step.
Figure 2:
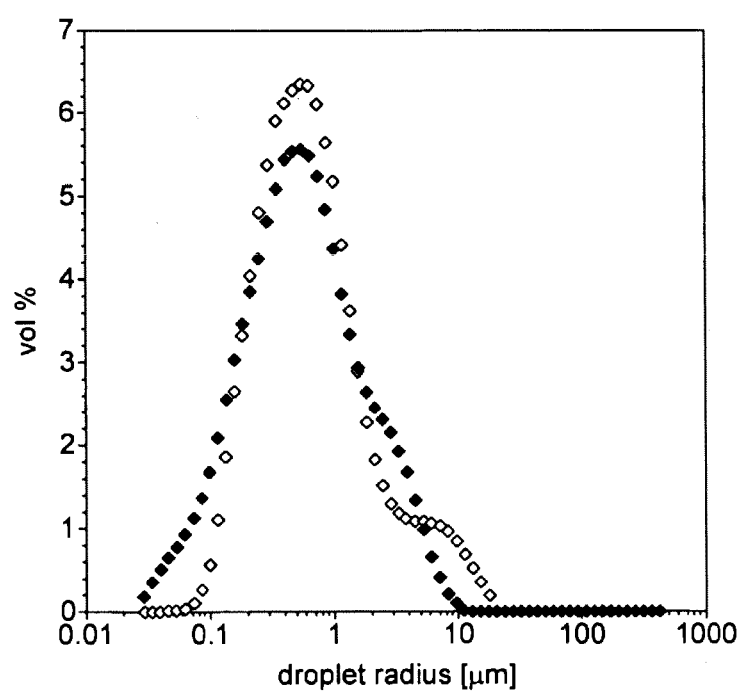
FIG. 2 shows the re-hydration of paraffin-oil based, thermally cross-linked gel with R=0.5 μm. The white squares show the droplet radius distribution of emulsion created after cross-linking. The black squares show the droplet radius distribution of emulsion obtained after rehydration of the dried gel with 20 mM imidazole, pH=7.0 buffer. The figure shows that the process is fully reversible, the particle size of the droplets remains the same as in the initial emulsion.

The polar low molecular compound is detected by reemulsifying the solid product in water and analysing the composition of water containing said polar low molecular compound.

The following of the specification is made in relation with the examples.

Example 1

Preparation of the Emulsion

A coarse oil-in-water emulsion where the dispersed phase has a diameter of =0.5 μm is made by gradually pouring under continuous stirring the MCT into a pH=7.0, 1 wt % protein solution. The protein solution can be buffered (20 mM imidazole solution, non food-grade method) or the pH can be adjusted to 7.0 with sodium hydroxide (food-grade method).

The coarse emulsions is homogenized for 300 sec with a rotating dispersing unit, or, for the finest droplet sizes, a high pressure homogeniser. The shearing speed/pressure determines the average droplet size of the emulsion template and subsequently the average cell size.

The emulsion is left for ca. 1 hour to allow complete protein adsorption. The emulsion is then washed, i.e. unabsorbed protein in solution is removed by dilution. This is reached by allowing the emulsion to cream in a decantation flask or, for the finest emulsions, by centrifugation. The aqueous phase is removed and the concentrated emulsion is re-diluted with ca. 5 times its volume with water (food-grade method) or pH=7.0 20 mM imidazole buffer. This step is repeated twice, resulting in a dilution of the unabsorbed protein in the continuous phase by two orders of magnitude. The irreversibility of protein adsorption mentioned above allows the obtention of stable emulsions with very low amounts of unabsorbed proteins. Unabsorbed protein can be reused.

Example 2

Preparation of the gel with Glutaraldehyde

The adsorbed protein molecules are cross-linked, to ensure protein layer stability upon the later removal of the continuous phase. Adsorbed protein cross-linking are obtained chemically with glutaraldehyde, yielding a non food-grade material.

The concentrated, washed emulsion is poured in the same volume of 1 wt % glutaraldehyde pH=7.0 buffered solution to ensure the cross-linking of adsorbed protein molecules while avoiding inter-particle cross-linking. The dilute emulsion is left for 5 minutes under gentle stirring. The cross-linked emulsion is washed to separate non-reacted glutaraldehyde in a similar manner to step 3 above, to obtain a concentrated emulsion with cross-linked interfacial protein. This method yields a non-food grade material.

Glycerol or D(+)-Saccharose is added to the creamed, concentrated emulsions up to a concentration of 0.5 wt % under gentle stirring. The concentrated emulsion is mould into a high width-to-height ratio recipient and allowed to dry for a period of 72 h under ventilation at room temperature to yield a lipidic transparent gel.

The measure of the oil-droplets with a Malvern MasterSizer gives a diameter of the order of 80 microns.

Example 3

Preparation of the gel with Transglutaminase (Tgase)

Another way of crosslinking the proteins is with Tgase. The concentrated, washed emulsion is poured in the same volume of 1 U/g TGase solution and is left for 1 hour minutes under gentle stirring. The emulsion is then washed to separate the unadsorbed TGase and TGase excipient in a similar manner to step 3 above and is left in the dilute state at 55° C. for ca 10 hours. Being a protein, TGase concurrently and irreversibly adsorbs at the oil-water interface. The washing step ensures that no major pH shift occurs during the 10 hour 55° C. period. This method yields a food grade material. Glycerol or D(+)-Saccharose is added to the creamed, concentrated emulsions up to a concentration of 0.5 wt % under gentle stirring. The concentrated emulsion is mould into a high width-to-height ratio recipient and allowed to dry for a period of 72 h under ventilation at room temperature to yield a lipidic transparent gel.

The measure of the oil-droplets with a Malvern MasterSizer gives a diameter of the order of 80 microns.

Example 4

Preparation of the gel by Heating

Another way of crosslinking the proteins is by heating the emulsion.

The concentrated, washed emulsion is heated at 80° C. in an oven and kept at this temperature for 1 h. This method yields a food grade material. Glycerol or D(+)-Saccharose is added to the creamed, concentrated emulsions up to a concentration of 0.5 wt % under gentle stirring. The concentrated emulsion is mould into a high width-to-height ratio recipient and allowed to dry for a period of 72 h under ventilation at room temperature to yield a lipidic transparent gel.

The measure of the oil-droplets with a Malvern MasterSizer gives a diameter of the order of 80 microns.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A solid product comprising oil-droplets having a diameter of 0.1 to 100 microns, cross-linked proteins at an interface of the droplets, and glycerol between the cross-linked protein interfaces, the solid product is a gel, and the cross-linked proteins are selected from the group consisting of milk proteins and soy proteins.

* * * * *